(12) United States Patent
Marchetti et al.

(10) Patent No.: US 10,477,281 B2
(45) Date of Patent: Nov. 12, 2019

(54) METHOD AND SYSTEM FOR AUTOMATICALLY SELECTING PARTS OF A VIDEO AND/OR AUDIO MEDIA CONTENT BASED ON INFORMATION OBTAINED FROM SOCIAL NETWORKS

(71) Applicant: Telecom Italia S.p.A., Milan (IT)

(72) Inventors: Marco Marchetti, Turin (IT); Giovanni Martini, Turin (IT)

(73) Assignee: Telecom Italia S.p.A., Milan (IT)

( * ) Notice: Subject to any disclaimer, the term of this patent is extended or adjusted under 35 U.S.C. 154(b) by 0 days.

(21) Appl. No.: 15/109,325

(22) PCT Filed: Dec. 30, 2013

(86) PCT No.: PCT/EP2013/078127
§ 371 (c)(1),
(2) Date: Jun. 30, 2016

(87) PCT Pub. No.: WO2015/101385
PCT Pub. Date: Jul. 9, 2015

(65) Prior Publication Data
US 2016/0330526 A1 Nov. 10, 2016

(51) Int. Cl.
*H04H 60/33* (2008.01)
*H04N 21/61* (2011.01)
(Continued)

(52) U.S. Cl.
CPC ......... *H04N 21/6175* (2013.01); *G06Q 30/00* (2013.01); *H04L 67/10* (2013.01);
(Continued)

(58) Field of Classification Search
CPC ........... H04N 21/8549; H04N 21/5456; H04N 21/6175; H04N 21/4788; H04N 21/2668;
(Continued)

(56) References Cited

U.S. PATENT DOCUMENTS 8,442,265 B1  5/2013  Bosworth et al.
9,467,723 B2 * 10/2016  Osminer .............. H04N 21/251
(Continued)

FOREIGN PATENT DOCUMENTS

WO   2013/037078 A1   3/2013

OTHER PUBLICATIONS

Mar. 6, 2014—(WO) International Search Report—App PCT/EP2013/078127.
(Continued)

*Primary Examiner* — Nasser M Goodarzi
*Assistant Examiner* — Patrick A Ryan
(74) *Attorney, Agent, or Firm* — Banner & Witcoff, Ltd.

(57) ABSTRACT

A method is proposed comprising: receiving at least one video and/or audio content distributed to a plurality of individuals; monitoring Social Network data of at least one online Social Network, wherein the monitored Social Network data are directly or indirectly related to the received video and/or audio content; filtering the monitored Social Network data of the at least one online Social Network related to the received video and/or audio content by applying at least one filtering criterion based on a predetermined metric, for identifying at least one part of the received video and/or audio content; extracting from the received video and/or audio content the at least one identified part, and making available to a user the selected at least one part of the video and/or audio content.

19 Claims, 6 Drawing Sheets

(51) Int. Cl.

| | | |
|---|---|---|
| *H04N 21/25* | (2011.01) | |
| *H04N 21/472* | (2011.01) | |
| *H04N 21/262* | (2011.01) | |
| *H04N 21/458* | (2011.01) | |
| *H04N 21/466* | (2011.01) | |
| *G06Q 30/00* | (2012.01) | |
| *H04N 21/2665* | (2011.01) | |
| *H04N 21/2668* | (2011.01) | |
| *H04N 21/4788* | (2011.01) | |
| *H04N 21/81* | (2011.01) | |
| *H04N 21/845* | (2011.01) | |
| *H04N 21/8549* | (2011.01) | |
| *H04L 29/08* | (2006.01) | |
| *H04N 21/24* | (2011.01) | |

(52) U.S. Cl.
CPC ....... *H04N 21/2402* (2013.01); *H04N 21/251* (2013.01); *H04N 21/252* (2013.01); *H04N 21/2665* (2013.01); *H04N 21/2668* (2013.01); *H04N 21/26258* (2013.01); *H04N 21/458* (2013.01); *H04N 21/466* (2013.01); *H04N 21/472* (2013.01); *H04N 21/4788* (2013.01); *H04N 21/812* (2013.01); *H04N 21/8456* (2013.01); *H04N 21/8549* (2013.01)

(58) Field of Classification Search
CPC ............. H04N 21/2665; H04N 21/252; H04N 21/26258; H04N 21/251; H04N 21/472; H04N 21/466; H04N 21/458; G06F 17/30867; G06F 17/30796; G06F 17/30817

See application file for complete search history.

(56) References Cited

U.S. PATENT DOCUMENTS

| | | | |
|---|---|---|---|
| 2011/0126250 A1* | 5/2011 | Turner | H04N 5/76 725/109 |
| 2011/0213681 A1 | 9/2011 | Shahid | |
| 2011/0238754 A1 | 9/2011 | Dasilva et al. | |
| 2012/0096357 A1 | 4/2012 | Folgner et al. | |
| 2012/0174157 A1 | 7/2012 | Stinson, III et al. | |
| 2012/0254917 A1 | 10/2012 | Burkitt et al. | |
| 2012/0291070 A1 | 11/2012 | Feng et al. | |
| 2013/0263166 A1 | 10/2013 | Fleischman | |
| 2013/0268973 A1 | 10/2013 | Archibong et al. | |
| 2015/0339382 A1* | 11/2015 | Skolicki | H04N 21/8549 707/722 |

OTHER PUBLICATIONS

Jun. 30, 2016—(WO) Written Opinion of the ISA—App PCT/EP2013/078127.

\* cited by examiner

| PeakID | PrID | Time | PeakTime | PeakValue | UrlAniGif | UrlAudioClip | UrlVideoClip |
|---|---|---|---|---|---|---|---|
| | | | | | | | |
| | | | | | | | |

Fig. 7

| PrID | PeakID | PostId | ScreenName | Text | rtweetcnt |
|---|---|---|---|---|---|
| | | | | | |
| | | | | | |

Fig. 8

METHOD AND SYSTEM FOR AUTOMATICALLY SELECTING PARTS OF A VIDEO AND/OR AUDIO MEDIA CONTENT BASED ON INFORMATION OBTAINED FROM SOCIAL NETWORKS

BACKGROUND

Field of the invention

The present invention relates broadly to telecommunications, data networks such as the Internet, and services that are provided to the people through the Internet. In particular, the present invention relates to a method for, and a system capable of, automatically selecting parts, e.g. clips of video and/or audio contents, for example TeleVision (TV) broadcast programmes, radio broadcast programmes, Internet streamed video and/or audio contents, exploiting information obtained from online Social Networks.

Overview of the Related Art

The very large number of broadcast programmes, like TV programmes and radio programmes (either broadcast over the air or via cable TV/radio), and the limited time nowadays available to almost everyone, often prevent people from being able to enjoy many of the programmes they would like.

Video and/or audio recorders allow persons to record a program of interest for them at the time the program is broadcast, and to enjoy the recorded program at a later time, at the choice of the person.

In U.S. Pat. No. 8,442,265 a mobile device analyzes frames before and after a particular frame of a real-time video to identify one or more social network objects, and selects one or more frames before and after the particular frame based on social network information for further storage in the mobile device.

SUMMARY OF THE INVENTION

The Applicant has noticed that there are broadcast programmes (e.g., TV shows, radio shows, transmitted over the air or via cable) that could be enjoyed by a person without the need for the person to attend the programmes in their entirety, which is a time-consuming activity.

The Applicant has perceived that it would be useful to make available to the public a service making possible for a person to enjoy broadcast TV, radio, or Internet-distributed programmes (generally, video and/or audio contents distributed at the same time to a plurality of individuals) without the need of spending a lot of time for assisting to such programmes in their entirety, attending to just some parts thereof, e.g. the relevant, more interesting parts of TV, radio, Internet programmes after they have been broadcast or transmitted in streaming over a data network like the Internet.

The Applicant has considered the possibility of exploiting the nowadays largely common online Social Networks as a source of information for identifying and selecting part(s) of video and/or audio contents broadcast via TV or radio, or transmitted in streaming over the Internet.

A Social Network is a social structure made of network nodes which generally correspond to individuals or organizations. A Social Network indicates the ways in which individuals or organizations are connected through various social relationships. The nodes of a Social Network are the individual actors within the networks, and Social Network's ties are the relationships between actors. A Social Network is often displayed in a social network diagram, where nodes are the points and ties are the lines. Social Networks have also been used to examine how people interact with each other, characterizing the many connections that link persons together.

Nowadays, online Social Networks (i.e., Social Networks implemented in a data network like the Internet) are very popular. Probably, the most popular online Social Networks are Twitter and Facebook. Other known online Social Networks are Google Plus and Tumblr.

Many people interact through online Social Networks, e.g. by posting "tweets" in Twitter or posts ("like"/"dislike" or comments) on Facebook.

The Applicant has realized that the huge amount of information made available through online Social Networks can be advantageously exploited for automatically identifying and selecting parts of video and/or audio contents distributed at the same time to a plurality of individuals, e.g. broadcast via TV or radio, over the air or through cable, or transmitted in streaming over a data network like the Internet. The part(s) of the video and/or audio contents are identified and selected in a non-arbitrary way, according to predetermined criteria, by filtering monitored data of online Social Networks applying filtering criteria based on predetermined metrics. For example, the identified and selected parts of the video and/or audio content may be parts of (at least potential) particular relevance of the video and/or audio content. Such parts of particular relevance are identified on the basis of an analysis of the reactions to the distributed video and/or audio content by persons being part of the plurality of individuals to which the video and/or audio content is distributed, said reactions being posted, during the distribution of the video and/or audio content, through the online Social Networks by those users thereof that are assisting to the video and/or audio content. The identified and selected part(s) of the video and/or audio contents can then be offered for enjoyment to the public (preferably, to subscribers) as a service.

Particularly, according to one aspect of the present invention a method is proposed for comprising:
  receiving at least one video and/or audio content distributed to a plurality of individuals;
  monitoring Social Network data of at least one online Social Network, wherein the monitored Social Network data are directly or indirectly related to the received video and/or audio content;
  filtering the monitored Social Network data of the at least one online Social Network related to the received video and/or audio content by applying at least one filtering criterion based on a predetermined metric, for identifying at least one part of the received video and/or audio content;
  extracting from the received video and/or audio content said at least one identified part, and
  making available to a user the selected at least one part of the video and/or audio content.

Particularly, the at least one video and/or audio content is distributed to said plurality of individuals at the same time.

Preferred features of the present invention are set in the dependent claims.

Said Social Network data related to the received video and/or audio content preferably comprise reactions of persons belonging to said plurality of individuals to the at least one video and/or audio content during the distribution thereof, wherein said reactions are posted through the at least one online Social Network.

Said filtering criterion based on a predetermined metric may comprise determining at least one peak in a time trend of number of reactions of the users of the at least one online Social Network to the at least one video and/or audio content during the distribution thereof.

Said filtering and said extracting may be performed either at the end of the distribution time of the at least one video and/or audio content, or during the distribution time of the at least one video and/or audio content.

The method may comprise:
subdividing the distribution time of the at least one video and/or audio content into at least two successive time intervals,
in each time interval performing said monitoring, filtering and extracting.

Preferably, at the end of the distribution time of said video and/or audio content, at least one of the extracted identified part is discarded, in order to retain a predetermined number of extracted parts of the video and/or audio content corresponding to a predetermined number of identified parts based on said based on said predetermined metric.

Said predetermined number of identified parts may correspond to a predetermined number of peaks in the time trend of number of reactions of the users.

Said extracting from the received video and/or audio content said at least one identified part may comprise extracting a video and/or audio clip in a time interval around the time of said identified peak.

Said making available may comprise creating an audio and/or video clip by composing a plurality of said extracted parts of the video and/or audio content.

Another aspect of the present invention relates to a system adapted to implement the above method.

Particularly, according to an aspect of the present invention a system is provided, comprising:
an acquisition module for the acquisition of at least one video and/or audio content distributed (particularly, at the same time) to a plurality of individuals;
a monitoring module for monitoring Social Network data of at least one online Social Network, wherein the monitored Social Network data are directly or indirectly related to the received video and/or audio content;
a control module for:
filtering the monitored Social Network data of the at least one online Social Network related to the received video and/or audio content by applying at least one filtering criterion based on a predetermined metric, for identifying at least one part of the received video and/or audio content, and
extracting from the received video and/or audio content said at least one identified part, and
a repository module for storing the at least one extracted part of the received video and/or audio content, and for making available to a user the stored at least one extracted part of the video and/or audio content.

Said Social Network data related to the received video and/or audio content preferably comprise reactions of persons belonging to said plurality of individuals to the at least one video and/or audio content during the distribution thereof, wherein said reactions are posted through the at least one online Social Network.

Said filtering criterion based on a predetermined metric may comprises determining at least one peak in a time trend of number of reactions of the users of the at least one online Social Network to the at least one video and/or audio content during the distribution thereof.

Said filtering and said extracting may be performed either at the end of the distribution time of the at least one video and/or audio content, or during the distribution time of the at least one video and/or audio content, particularly by: subdividing the distribution time of the at least one video and/or audio content into at least two successive time intervals, and in each time interval performing said monitoring, filtering and extracting.

According to still another aspect of the present invention, a non-transitory computer program is provided, adapted to implement the method of the present invention when executed by a computer system.

BRIEF DESCRIPTION OF THE DRAWINGS

These, and other, features and advantages of the solution according to the present invention will be better understood by reading the following detailed description of an embodiment thereof, provided merely by way of non-limitative example, to be read in conjunction with the attached drawings, wherein.

DETAILED DESCRIPTION OF EXEMPLARY EMBODIMENTS OF THE INVENTION

Figure 1:
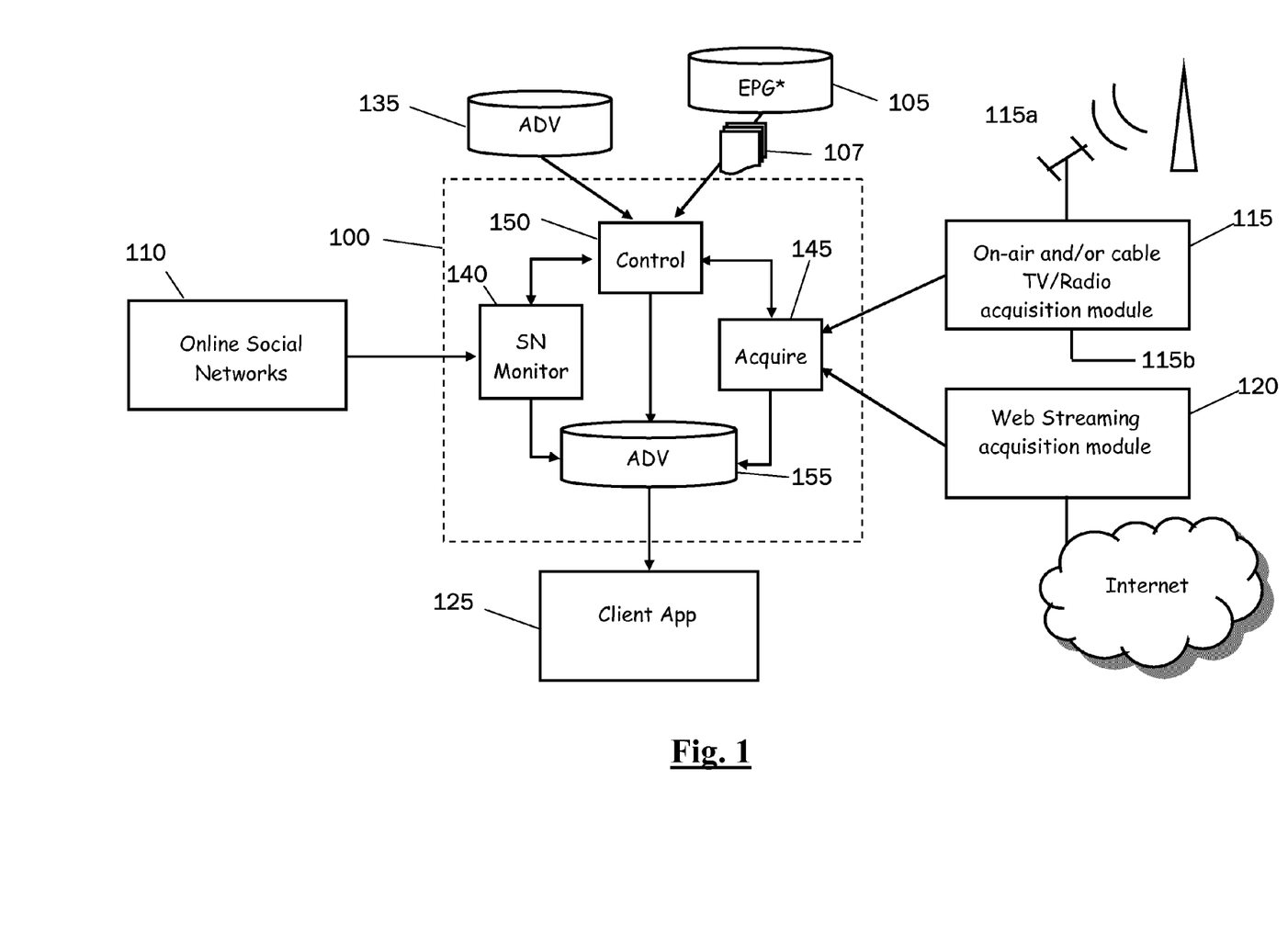
FIG. 1 is a sketch of the structure of a system adapted to implement methods according to embodiments of the present invention.

FIG. 1 schematically sketches the structure of a system 100 adapted to implement methods according to embodiments of the present invention.

The system 100 preferably interfaces with the following external entities (systems, sub-systems, data sources): a supporting data source 105; one or more online Social Network(s) 110, e.g. Twitter™, Facebook™, Google Plus™, Tumblr™; a TV and/or radio receiver and acquisition module 115 for receiving on-air TV and/or radio broadcasts or cable transmissions; an Internet (Web) streaming acquisition module 120 for the acquisition of Internet streamed audio and/or video contents; fruition and rendering end-user client applications (client modules) 125, and optionally, an advertisement repository 135.

The supporting data source 105 provides to the system 100 Electronic Programme Guides (EPGs) 107 enriched with meta-data. EPGs provide electronically information about the scheduling of TV and/or radio programmes (either broadcast over the air or transmitted through cable) and/or Internet streaming programmes, including start and end times of the programmes A system manager managing the system 100 may select for monitoring a subset of such programmes, and thus the system 100 takes into consideration only some of the programmes included in the EPGs 107 provided by the supporting data source 105. The meta-data enriched EPGs 107 (hereinafter also referred to shortly as EPG*s) contain, in addition to the usual scheduling information of the programmes, information adapted to identify the programmes in the online Social Networks 110, e.g., Twitter identifiers, Twitter hashtags, identifiers of Facebook pages.

Figure 2:
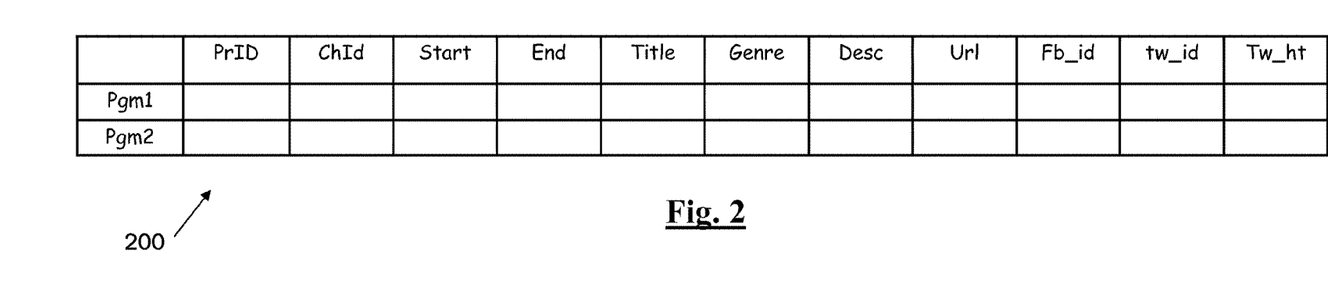
FIG. 2 schematically shows a metadata-enriched Electronic Programme Guide according to an embodiment of the present invention, exploited by the system of FIG. 1.

FIG. 2 schematically shows a meta-data enriched Electronic Programme Guide (EPG*) 107 according to an embodiment of the present invention. The EPG* 107 is schematized as a table 200, including a table entry (e.g., a table row) for each programme included in the EPG* 107, like the two exemplary programmes Pgm1 and Pgm2. For each of the programmes, the EPG* table 200 contains for example the following data: an identifier of the programme PrID, an identifier ChID of the TV or radio channel on which the programme will be transmitted; a scheduled transmission start time Start of the programme; a scheduled transmission end time End of the programme; the title Title of the programme; the genre Genre of the programme; a short description Desc of the programme; the URL (Uniform Resource Locator) URL of the Internet site transmitting the programme in streaming; online Social Network data that identify the programme in one or more online Social Networks, like for example an identifier Fb_id of the programme in Facebook, an identifier Tw_id of the programme in Twitter, a hashtag Tw_ht used in Twitter for tagging the programme The EPG*s can for example be compiled in XML language. The EPG* 107 may include additional data, like for example a URL of a Web site of the programme The on-air and/or cable TV and/or radio receiver and acquisition module 115 is configured to receive on-air 115a and/or cable 115b TV and/or radio transmissions of selected TV and/or radio broadcasters. The on-air and/or cable TV and/or radio receiver and acquisition module 115 can provide to the system 100 clips of the received and acquired programmes, for example in one or more formats like mp4, and preferably organized by broadcaster/transmitter.

The Internet streaming acquisition module 120 serves for acquiring audio and/or video streams from Internet sites (e.g., Web streamed live sources). Similarly to the on-air and/or cable TV and/or radio receiver and acquisition module 115, the Internet streaming acquisition module 120 can provide to the system 100 clips of the received and acquired streamed programmes, for example in one or more format like mp4, and preferably organized by transmitting Internet site.

The fruition and rendering end-user client applications 125 are for example applications for smartphones and tablets (e.g. Android apps or iOS apps), applications for smart TV sets, Web applications 130, e.g. XHTLM Web apps, widgets included in Web sites.

The advertisement repository 135 maintains pre-roll advertisements, advertising banners and/or video clips and/or audio clips associated with programmes and with proper online Social Network indicators (e.g. a set of pre-rolls associated with a TV and/or radio show, or to a product's brand hashtag). As explained in the following, the content can be used by the system 100 and delivered to the end user clients 125 by adding specific advertising video clips to each synthetized programme The system 100 comprises a synthesis server (hereinafter denoted with the same reference numeral 100 as the system 100) configured to collect and/or receive in input from the online Social Network(s) 110 real-time content and indicators, such as trending topic, tweets per minutes, posts on specific blogs, etc, and in general information useful to enable the synthesis server 100 identifying and selecting, according to predetermined criteria, parts of video and/or audio contents (programmes broadcast over the air by TV and/or radio broadcasters, and/or transmitted via cable, and/or video and/or audio contents delivered in streaming by Internet sites). In embodiments of the present invention, the synthesis server 100 receives from the online Social Network(s) 110 indicators to be used for identifying and selecting parts of video and/or audio contents, and/or receive said indicators from providers of real-time statistics related to the online Social Network(s) 110, and/or compute internally said indicators, based on the data obtained from the Social Network(s) 110

The synthesis server 100 is also configured to receive and store internally the video and/or audio contents acquired by the acquisition modules 115 and 120.

As explained above, the meta-data enriched EPG*s 107 provided by the supporting data source 105 contain correlations between video and/or audio programmes (e.g., timing for on-air transmission of TV and/or radio shows, or webcast show appearances) and their related social media information (e.g., official or dynamically computed Twitter hashtags associated to a certain programme, the official Facebook page of the programme, and so on). Such information is exploited by the synthesis server 100 for the correlation between video and/or audio programmes and the corresponding posts, related to the programmes, in the Internet Social Network(s) 110 (e.g., Twitter tweets containing the programmes' hashtags).

In an embodiment of the present invention, the synthesis server 100 comprises the following functional modules: an online Social Network monitor module 140; an acquisition module 145; a control module 150, and a synthesis repository 155.

The online Social Network monitor module 140 is configured to receive/collect data (e.g. Twitter tweets, Facebook fan pages updates, Google Plus posts, and the like) in pull and/or push notifications from the online Social Network(s) 110, and to analyze the received/collected data by filtering them according to predetermined filtering criteria based on predetermined metrics, e.g. to analyze the time trend of reactions (posted through the online Social Network(s) 110) of persons assisting to the one or more of the monitored video and/or audio contents in order to detect those time instants (e.g. in terms of "absolute" time, i.e. year-month-day hour-minute-second in a certain time zone) when something on the online Social Network(s) 110 is happening in relation to online Social Network indicators of one or more of the monitored video and/or audio contents (e.g., a threshold of posts or conversations per minute for a predefined social media indicator, e.g. a Twitter hashtag or a Facebook page, related to a program is trespassed, specific hashtags/keywords have been mentioned by online Social Networks users, a peak in Twitter tweets is detected at a certain time instant).

The acquisition module 145 of the synthesis server 100 is fed by the on-air/cable TV and/or radio acquisition modules 115 and the Internet streaming acquisition module 120. The acquisition module 145 collects and stores time-stamped video and/or audio contents coming from the external sources. The acquisition module 145 may collect and store the video and/or audio contents as they are provided by the external acquisition modules 115 and 120, without performing any selection of parts of the received video and/or audio contents. For example, the received video and/or audio contents can be stored in buffers of sufficient size, e.g. corresponding to some hours (3 hours for example) of duration of the video and/or audio contents. These buffers may be emptied after the synthesis of the video and/or audio contents has been made. Alternatively, the acquisition module 145 may keep recordings of the whole video and/or audio contents (this may be useful for enabling the synthesis server 100 to synthesize the video and/or audio contents not only while they are transmitted, but also afterwards, at later times, based on different synthesis criteria).

The control module 150 operates to coordinate the association between time, Social Network indicators and Social Network contents, and the video and/or audio contents (e.g. an on-air broadcast TV programme), in order to identify, select and store the relevant part(s) of the video and/or audio content (e.g. video-clips, snapshots, animated GIF images, or other animated compressed graphic images), possibly in association with related Social Network contents, e.g. tweets and retweets occurred during the transmission of the selected parts of the video and/or audio contents. GIF (Graphics Interchange Format) is a set of standards and file formats for storage of digital color images and short animations. The control module 150 also instructs the Social Network monitor module 140 about which Social Network data receiving/collecting from the Social Networks 110.

The synthesis repository 155 stores the syntheses of the video and/or audio contents, synthesized parts of broadcast programs, selected by the control module 150, and possibly the related social media content. The syntheses of the video and/or audio contents stored in the synthesis repository 155 can be accessed by the end user client applications 125.

The contents stored in the synthesis repository 155 can be accessed and properly visualized and rendered to the end users by the client applications 125. For example, an application 125 installed on an end user smartphone can present, for a certain TV show, a synthesis thereof made up of a plurality of selected clips as a single video, possibly with over-impressed the related Social Network content (e.g., tweets). The final synthesis of a generic video and/or audio content stored in the synthesis repository 155 may be any mix of text (from the Social Networks 110), audio, video, images: for example, the final synthesis of a video and audio content can be made up of all the parts (video clips) selected from the original video and audio content, or the final synthesis can be just a final audio clip with some of the most significant Social Network related contents rendered as text to speech, or a collection of animated GIF files as captured around selected time instants, e.g. corresponding to peaks in Social Network indicators.

Figure 3:
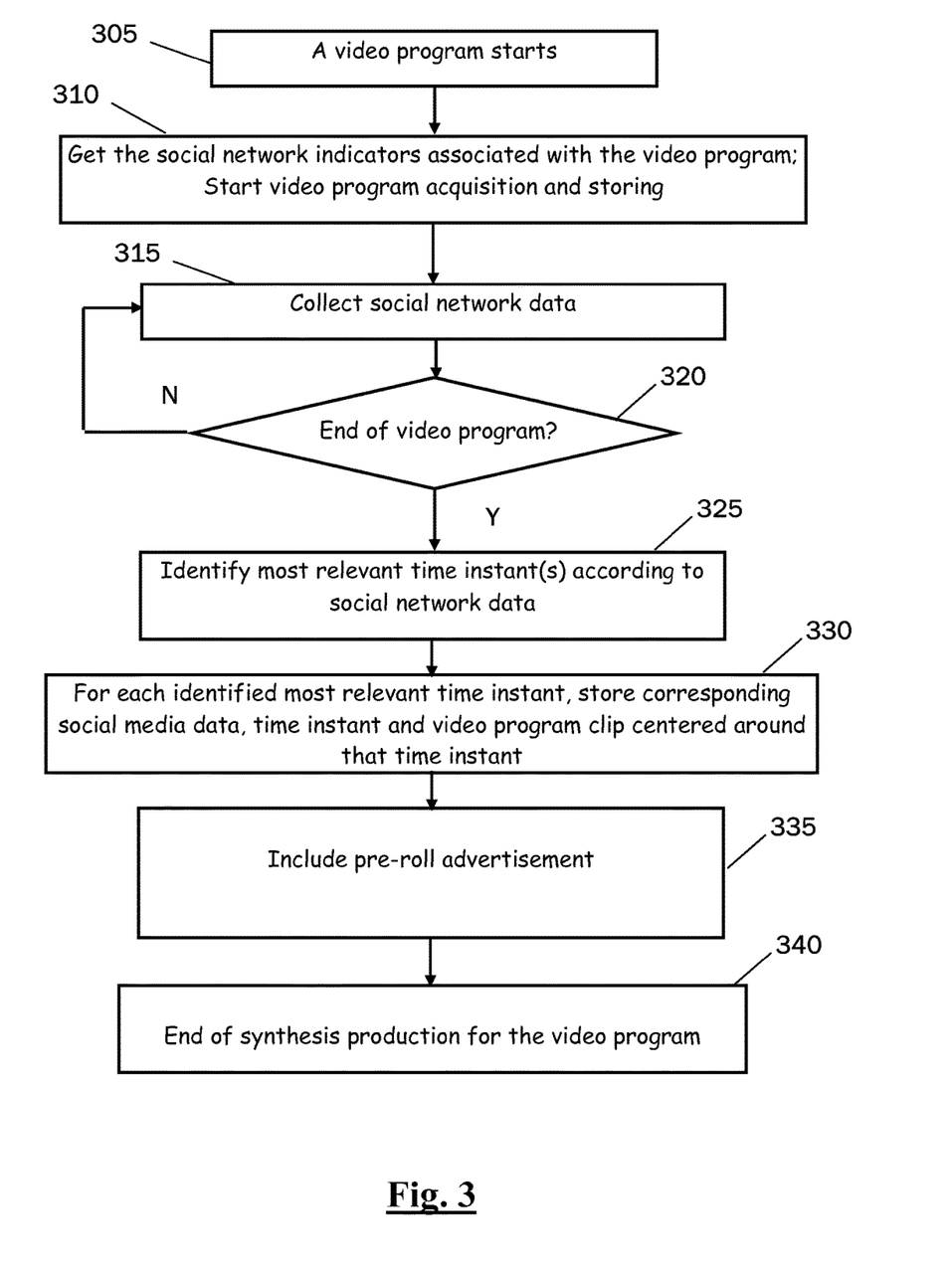
FIG. 3 is a schematic activities flow diagram of a method according to an embodiment of the present invention.

FIG. 3 shows a flowchart of the main steps of a method according to an embodiment of the present invention. Hereinafter, the example of a TV programme broadcast over the air is considered for simplicity, however the same holds true for any other video and/or audio content being a TV programme transmitted via cable, a radio programme broadcast over the air or transmitted via cable, an audio and/or video content diffused in streaming via Internet.

At the beginning, the synthesis server 100 triggers the procedures outlined in FIG. 3 each time a certain new programme (e.g. a TV show, or a Web streamed program) starts (block 305).

The control module 150 of the synthesis server 100 retrieves (block 310) from the proper meta-data enriched EPG* 107 the Social Network indicators (e.g., referring to the table 200 of FIG. 2, a TV programme Twitter hashtag Tw_ht, and/or Twitter identifier TW_id, and/or Facebook identifier Fb_id) associated to that programme. At the same time, based on the programme start time Start defined in the EPG* 107, the acquisition and recording of the programme by the acquisition module 145 is started.

The online Social Network monitor module 140 of the synthesis server 100 collects (block 315) data from the online Social Networks 110. As mentioned in the foregoing, the collection of data from the Social Networks 110 can be done in push or in pull mode, e.g. depending on the specific Application Program Interfaces (APIs) offered by the online Social Networks 110. The collection of the data from the online Social Networks 110 produces derivative real-time information, e.g. Twitter tweets per minute, posts per minute, "like"s per minute, etc.

The collection of the data from the online Social Networks 110, as well as the recording of the broadcast TV programme, continues until the programme ends (block 320). The end of the programme being recorded, and thus the end of the recording thereof and of the collection of the social media data, is determined based on the programme end time End defined in the EPG* 105. In other embodiments, the recording of the broadcast TV channel is not stopped upon reaching the programme end time End, and can continue indefinitely.

Then (block 325) the control module 150 of the synthesis server 100 analyzes the data and information collected from the Social Networks 110, in order to identify parts of the TV programme to be selected for thereafter creating the TV programme synthesis.

The control module 150 performs a selection and filtering of the data collected from the online Social Networks 110 by adopting a predetermined metric. Metrics used by the control module 150 to identify the parts of the TV programme can be any derivative obtained from the data collected from the online Social Networks 110, for example (but not limiting), tweets/posts/"like"s per minute related to Social Network indicator(s) of the TV programme, mentions of an author, occurrence of keywords, frequency of posts/tweets with a given sentiment, and so on.

For example, based on the data collected from the online Social Networks 110, the control module 150 may identify those instants/time intervals (in the time period during which the programme has been broadcast) during which peaks of conversation (e.g., peaks of tweets) occurred. For example as sketched in FIG. 4, exemplifying a curve (time trend) of number of tweets in time, during the transmission of the TV programme (the time interval between the programme start time Start and the programme end time End), the control module 150 identifies four peaks pk1, pk2, pk3 and k4 of tweets related to the transmitted TV programme.

For each of those conversation peaks (or for a subset of the most relevant conversation peaks), the control module 150 of the synthesis server 100 identifies the absolute time instants when such peaks have occurred. For example, referring again to FIG. 4, the control module 150 identifies that the four peaks of tweets pk1, pk2, pk3 and k4 occurred at the instants t1, t2, t3 and t4.

The control module 150 then selects, extracts from the TV programme, recorded by the acquisition module 145, parts thereof, i.e. video clips and/or audio clips, in a surrounding time interval centered around the identified time instants t1, t2, t3 and t4 (plus/minus a certain time interval) (block 330). The surrounding time interval around the time instants of the detected peaks may be of fixed duration (i.e., 1 minute before and 1 minute after the detected peak instant) or variable (e.g., if, by analyzing the TV programme, a change of scene is detected before the end of the 1 minute after the detected peak instant, that specific video clip could be ended before).

In addition to the multimedia (video and/or audio) content, the control module 150 of the synthesis server 100 may include in the final product of the synthesis not only the selected video clips and audio clips (or, alternatively, animated gif), but also the relevant online Social Network data (e.g. tweets, Facebook posts) occurred in those time intervals around the detected peaks.

The synthesis server 100 may also add pre-roll advertisement messages (e.g. an advertising banner, a short initial video clip) to the final set of the video synthesis (block 335). Such pre-roll advertisement messages may be associated to certain social media indicators (e.g. the hashtag of a brand) and/or specific TV programmes (e.g. a brand sponsoring a specific TV program), and can be included depending on the computed online Social Network indicators (e.g. if during a TV programme the hashtag or the name of a brand has been mentioned more than a certain threshold value).

The control module 150 then stores the final synthesis of the TV programme in the synthesis repository 155 of the synthesis server 100. The stored final synthesis, stored in the synthesis repository 155, is available for access and visualization by the end user client applications 125, 130 (block 340).

Figure 7:
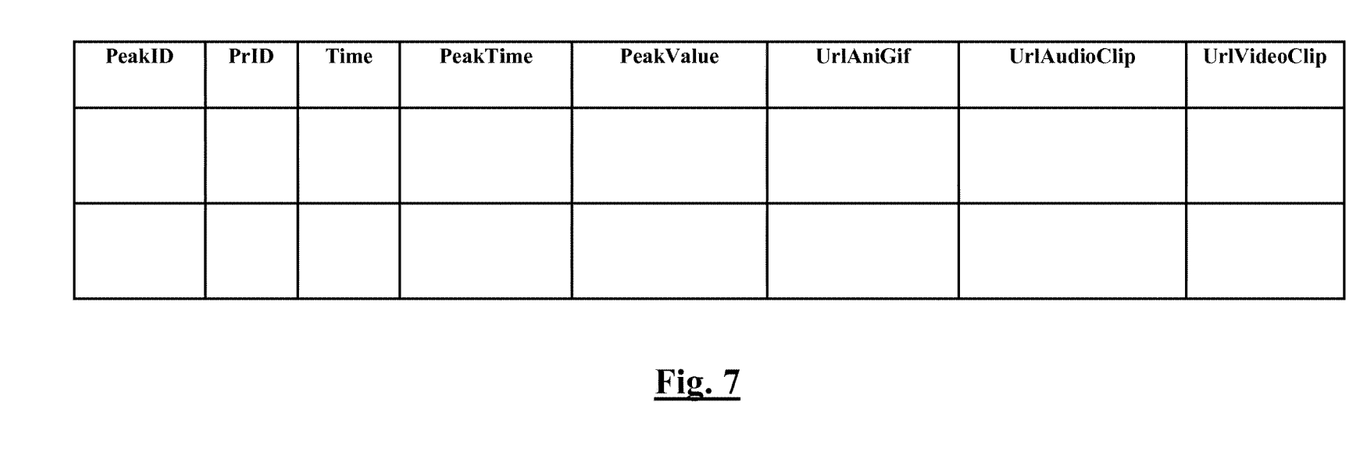
Figure 8:
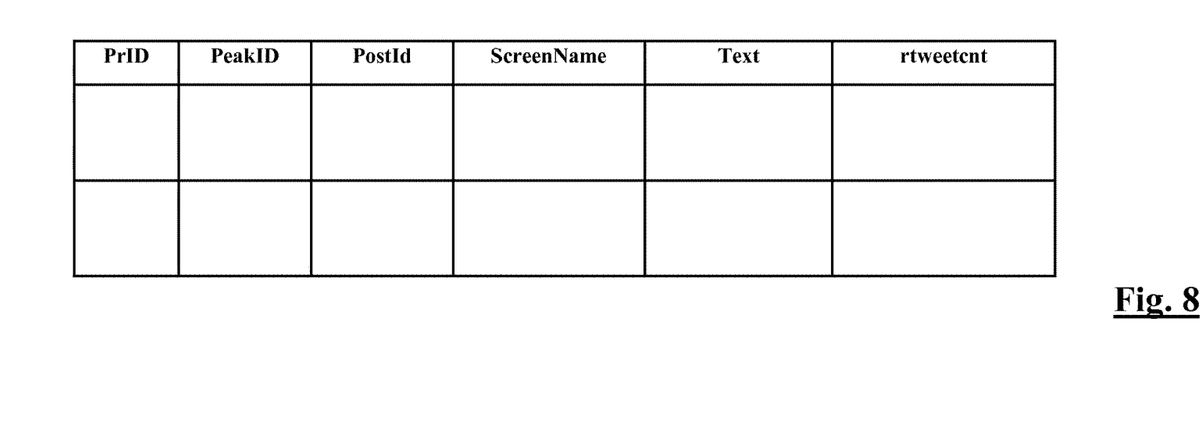

The tables depicted in FIGS. 7 and 8 schematize a possible, exemplary and non-limiting arrangement of data in the synthesis repository 155 of the synthesis server 100.

In the table of FIG. 7, for each detected peak of online Social Network events (like the four peaks of tweets pk1, pk2, pk3 and k4 considered in the above-described example), univocally identified by a peak identifier PeakID, of each video and/or audio content (like the previously considered TV programme), univocally identified by a programme identifier PrID, the table contains pointers (UrlAniGif, UrlAudioClip, UrlVideoClip) to the selected parts of that video and/or audio content corresponding to such peak, e.g. URLs pointing to storage locations of the synthesis repository 155. The table may also contain, for each peak, the time (Time, PeakTime) at which the peak occurred, and the value PeakValue of the conversation peak.

In the table of FIG. 8, for each detected peak of online Social Network events, univocally identified by the peak identifier PeakID, of each video and/or audio content, univocally identified by a programme identifier PrID, the table contains pointers (PostID, ScreenName, Text, rtweetcnt) to the online Social Network data (e.g., tweets, posts, the name of the author of the tweet) recorded in a time interval around such peak and related to that programme The table may contain additional data, for example depending on the type of online Social Network(s) 110 monitored.

For example, the end users (through the client application 125 running on their devices) can request information for the synthesis for a certain TV or radio programme, for example passing to the synthesis server 100 an identifier of the programme of interest and the numbers of the key/peak moments they are interested in, and possibly the type of synthesis they want (e.g., an end user could ask for the tweets, the video and/or audio clips and the animated gif captured for a number of three Social Network conversation peaks occurred during a two-hour TV show). It is up to the client application 125 to present to the end user such content in a proper manner e g as a comprehensive video (made up of all the single video-clips, impressed with the tweets that occurred in those intervals), or as an animated gif gallery with clickable associated audio-clips.

Figure 5:
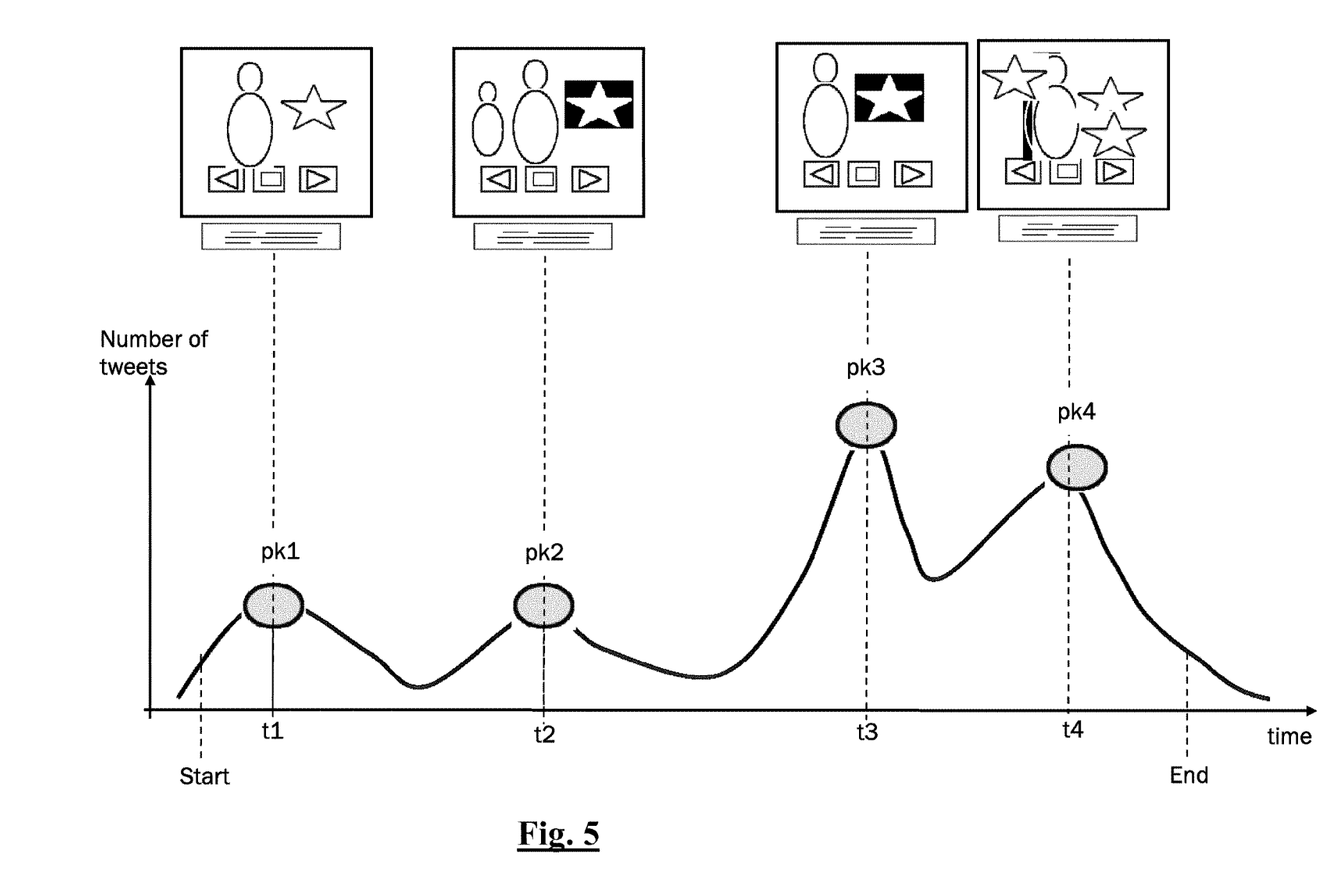
FIG. 5 pictorially shows a result of an automatic synthesis of the exemplary video programme.

The rendering on the user device of the TV programme synthesis is sketched in FIG. 5.

The actions flow outlined in FIG. 3 produces the synthesis of the generic video and/or audio content (e.g. the TV programme considered in the foregoing) when the associated video and/or audio content concludes.

In an alternative embodiment of the present invention, a different actions flow could be devised, that incrementally produces video and/or audio synthesis as the video and/or audio content is going on, making it available to clients during the show itself (continuous real-time production of the video synthesis).

Figure 6:
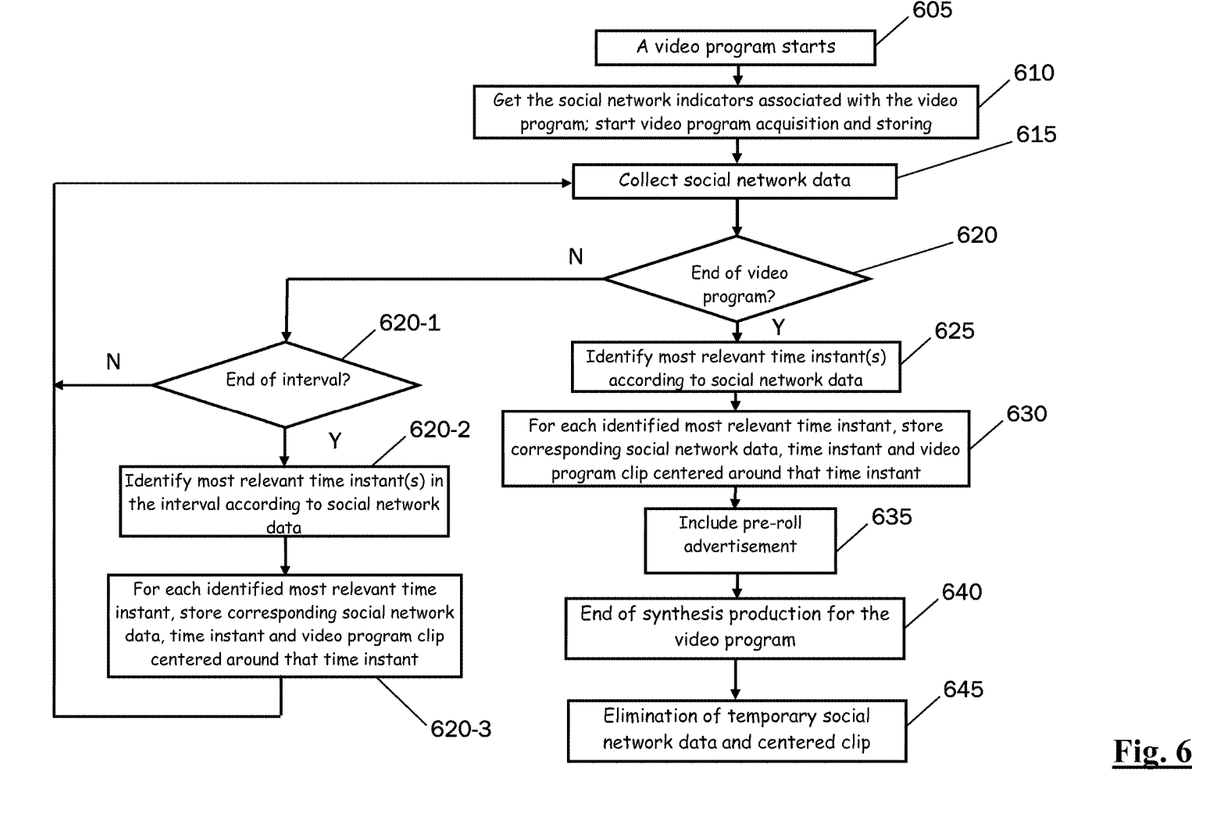
FIG. 6 is a schematic activities flow diagram of a method according to another embodiment of the present invention, and FIGS. 7 and 8 schematically show possible tabular arrangements of data in a synthesis repository of the system of FIG. 1.

An exemplary actions flow for such an alternative embodiment of the present invention is outlined in FIG. 6.

At the beginning, the synthesis server 100 triggers the procedures outlined in FIG. 6 each time a new programme starts (block 605). As for the description of the previous embodiment, a TV programme broadcast over the air is considered for simplicity by way of non-limiting example.

The control module 150 of the synthesis server 100 retrieves (block 610) from the meta-data enriched EPG* 107 the online Social Network indicators (e.g. the TV programme Twitter hashtags Tw_ht, and/or Twitter identifier TW_id, and/or Facebook identifier Fb_id) associated to that programme At the same time, based on the programme start time Start defined in the EPG* 107, the acquisition and recording of the TV programme by the acquisition module 145 is started.

The online Social Network monitor module 140 of the synthesis server 100 collects (block 615) data from the online Social Networks 110 in push or in pull mode. As in the foregoing, the collection of the data from the online Social Networks 110 produces derivative real-time information, e.g. Twitter tweets per minute.

The collection of the data from the online Social Networks 110, as well as the recording of the broadcast TV programme, may continue until the TV programme ends (block 620), as determined based on the programme end time End defined in the EPG* 107.

However, differently from the embodiment described above, during the broadcast of the TV programme (block 620, exit branch N) the control module 150 of the synthesis server 110 already performs, repeatedly after certain time intervals have passed (block 620-1) an analysis of the data and information collected from the online Social Networks during such time intervals, identifying (block 620-2) those instants/times in the considered time interval during which peaks of conversation (e.g., peaks of tweets) occurred, and for each of those conversation peaks (or for a subset of the most relevant conversation peaks), occurred in the just elapsed time interval, the control module 150 of the synthesis server 100 identifies the absolute time instants when such peaks have occurred, and extracts from the recorded part of TV programme recorded by the acquisition module 145 video clips and/or audio clips in a surrounding time interval centered around the identified time instants (plus/minus a certain time interval) (block 620-3), temporarily storing the extracted content in the synthesis repository 155. The time intervals may for example be time intervals of 10 minutes.

Figure 4:
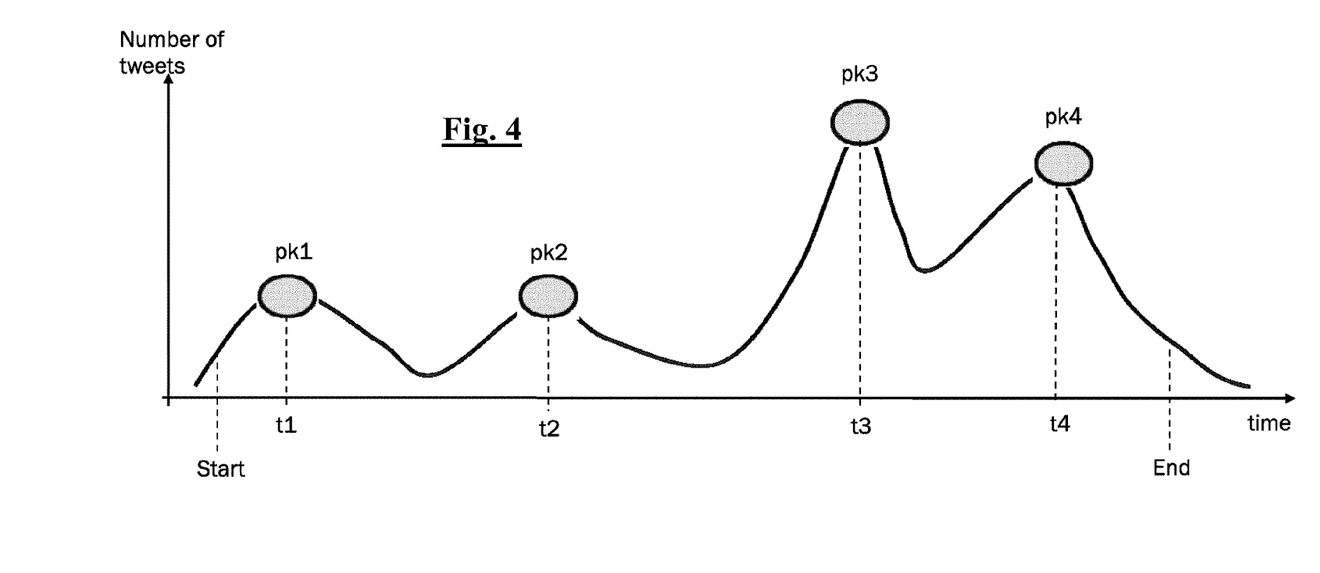
FIG. 4 exemplifies the variation in time (time trend) of posts by users of an online Social Network, e.g. Twitter, such posts being related to a certain, exemplary video and/or audio programme (e.g. a TV show or a radio show broadcast on air, or an Internet streamed video and/or audio programme) during the transmission time of such video and/or audio programme.

When the TV programme being recorded ends (block 620, exit branch Y) (as described in the foregoing, the end of the programme being recorded is determined based on the programme end time End defined in the EPG* 107), the control module 150 of the synthesis server 100 analyzes (block 625) the data and information collected from the online Social Networks 110, identifying those instants/times (in the whole time period during which the programme has been broadcast) during which peaks of conversation (e.g., peaks of tweets) occurred (again, as for example sketched in FIG. 4).

For each of those conversation peaks (or for a subset of the most relevant conversation peaks), the control module 150 of the synthesis server 100 identifies the absolute time instants when such peaks have occurred, and extracts from the recorded TV programme video clips and/or audio clips in a surrounding time interval centered around the identified time instants (plus/minus a certain time interval) (block 630). As described in the foregoing, the surrounding time interval around the time instants of detected peak may be of fixed duration (i.e., 1 minute before and 1 minute after the detected peak instant) or variable.

In addition to the video and/or audio content, the final product of the synthesis may include not only the video clips, audio clips and animated GIF, but also the relevant social media data (e.g. tweets, Facebook posts) occurred in those peak intervals.

Also, as described in the foregoing, the synthesis server 100 may add a pre-roll advertisement messages (or an advertising banner) to the final set of the video synthesis (block 635).

The final set of the video and/or audio content synthesis is stored in the synthesis repository 155 of the synthesis server 100. The stored final sets, stored in the synthesis repository 155, are available for access and visualization by the end user client applications 125 (block 640).

With the continuous, real-time production of video and/or audio synthesis, it may happen that what was considered as a peak in online Social Network events during a certain sub-interval of the total TV programme duration time, with the prosecution of the TV programme new possible higher peaks occur, and those that were initially detected are no longer the most relevant peaks. Therefore, at the end of the TV programme, it may be necessary (block 645)) to purge (i.e., discard) all the intermediate temporary synthesis material produced during the overall process and during the intermediate sub-intervals in order to eventually have only the N absolute most relevant peaks and associated data.

While some exemplary embodiments of the present invention have been described in the foregoing, those skilled in the art will be able, based on the teachings here provided, to make several changes, modifications to the described embodiments.

The invention claimed is:

1. A method comprising:
receiving at least one video content and audio content distributed to a plurality of individuals over a distribution time;
subdividing the distribution time of the at least one video content and audio content into two or more successive time intervals;
in each time interval of the two or more successive time intervals:
monitoring social network data of at least one online social network, wherein the monitored social network data are directly or indirectly related to the received at least one video content and audio content;
filtering the monitored social network data of the at least one online social network related to the received at least one video content and audio content by applying at least one filtering criterion based on a predetermined metric, for identifying at least one part of the received at least one video content and audio content;
extracting, from the received at least one video content and audio content, said at least one identified part; and
storing, in a repository, the extracted at least one identified part of the at least one video content and audio content;
making available, to a user, the extracted at least one identified part of the at least one video content and audio content;
based on social network data of the at least one online social network, comparing a number of user reactions to at least one stored identified part to a number of user reactions to at least one other stored identified part; and
discarding, based on the comparing and from the repository, the at least one stored identified part in order to retain a predetermined number of extracted parts of the at least one video content and audio content corresponding to a predetermined number of identified parts.

2. The method of claim 1, wherein said social network data related to the received at least one video content and audio content comprise reactions of persons belonging to said plurality of individuals to the at least one video content and audio content during the distribution time thereof, wherein said reactions are posted through the at least one online social network.

3. The method of claim 1, wherein said filtering criterion based on a predetermined metric comprises determining at least one peak in a time trend of a number of reactions of users of the at least one online social network to the at least one video content and audio content during the distribution time thereof.

4. The method of claim 1, wherein the discarding the at least one stored identified part is performed at an end of the distribution time of the at least one video content and audio content.

5. The method of claim 1, wherein said predetermined number of identified parts corresponds to a predetermined number of peaks in a time trend of number of reactions of users.

6. The method of claim 3, wherein said extracting from the received at least one video content and audio content said at least one identified part comprises extracting at least one of a video clip and audio clip in a time interval around the time of the at least one peak.

7. The method of claim 1, wherein said making available comprises creating at least one of an audio clip and a video clip by composing a plurality of the extracted at least one identified part of the at least one video content and audio content.

8. A system comprising:
an acquisition module for:
acquiring at least one video content and audio content distributed to a plurality of individuals over a distribution time; and
subdividing the distribution time of the at least one video content and audio content into two or more successive time intervals;
a monitoring module for monitoring social network data of at least one online social network, wherein the monitored social network data are directly or indirectly related to the acquired at least one video content and audio content;
a control module for:

filtering the monitored social network data of the at least one online social network related to the acquired at least one video content and audio content by applying at least one filtering criterion based on a predetermined number of peaks in a time trend of a number of reactions of users, for identifying at least one part of the acquired at least one video content and audio content; and extracting, from the acquired at least one video content and audio content, said at least one identified part, wherein the monitoring, the filtering, and the extracting are performed in each time interval of the two or more successive time intervals; and a repository module for storing the extracted at least one identified part of the acquired at least one video content and audio content, and for making available to a user the stored extracted at least one identified part of the at least one video content and audio content, wherein the control module is configured for discarding at least one of the stored extracted at least one identified part in order to retain a predetermined number of extracted parts of the at least one video content and audio content corresponding to the predetermined number of peaks in a time trend of number of reactions of users.

9. The system of claim 8, wherein said social network data related to the acquired at least one video content and audio content comprise reactions of persons belonging to said plurality of individuals to the at least one video content and audio content during the distribution time thereof, wherein said reactions are posted through the at least one online social network.

10. The system of claim 8, wherein the users are users of the at least one online social network and wherein the reactions are reactions to the at least one video content and audio content during the distribution time thereof.

11. The system of claim 8, wherein the discarding the at least one of the stored said at least one identified part is performed after the distribution time of the at least one video content and audio content, and wherein the discarding is based on the social network data of the at least one online social network.

12. The system of claim 11, wherein the control module is further configured to:

based on the social network data of the at least one online social network, compare a number of user reactions to the discarded at least one of the stored said at least one identified part to a number of user reactions to another part of the stored said at least one identified part, wherein the discarding is based on the comparing.

13. A non-transitory computer readable medium having a computer program stored thereon, the computer program adapted to perform the following when executed by a computer system:

receiving at least one video content and audio content distributed to a plurality of individuals over a distribution time;

subdividing the distribution time of the at least one video content and audio content into two or more successive time intervals;

in each time interval of the two or more successive time intervals:

monitoring social network data of at least one online social network, wherein the monitored social network data are directly or indirectly related to the received at least one video content and audio content;

filtering the monitored social network data of the at least one online social network related to the received at least one video content and audio content by applying at least one filtering criterion based on a predetermined metric, for identifying at least one part of the received at least one video content and audio content;

extracting, from the received at least one video content and audio content, said at least one identified part; and storing, in a repository, the extracted at least one identified part of the at least one video content and audio content;

making available, to a user, the extracted at least one identified part of the at least one video content and audio content; and discarding, from the repository, at least one of the stored at least one identified part in order to retain a predetermined number of extracted parts of the at least one video content and audio content corresponding to a predetermined number of identified parts based on the social network data of the at least one online social network, wherein the discarding is performed after the distribution time of the at least one video content and audio content.

14. The non-transitory computer readable medium of claim 13, wherein said social network data related to the received at least one video content and audio content comprise reactions of persons belonging to said plurality of individuals to the at least one video content and audio content during the distribution time thereof, wherein said reactions are posted through the at least one online social network.

15. The non-transitory computer readable medium of claim 13, wherein said filtering criterion based on a predetermined metric comprises determining at least one peak in a time trend of a number of reactions of users of the at least one online social network to the at least one video content and audio content during the distribution time thereof.

16. The non-transitory computer readable medium of claim 15, wherein said extracting from the received at least one video content and audio content said at least one identified part comprises extracting at least one of a video clip and audio clip in a time interval around the time of said at least one peak.

17. The non-transitory computer readable medium of claim 13, wherein the discarding the at least one of the stored the at least one identified part is performed at an end of the distribution time of the at least one video content and audio content.

18. The non-transitory computer readable medium of claim 13, wherein said predetermined number of identified parts corresponds to a predetermined number of peaks in a time trend of number of reactions of users.

19. The non-transitory computer readable medium of claim 13, wherein said filtering criterion based on a predetermined metric comprises determining at least one peak in a time trend of a number of reactions of users of the at least one online social network to the at least one video content and audio content during the distribution time thereof.

* * * * *